US009699569B2

(12) United States Patent
Inagaki

(10) Patent No.: US 9,699,569 B2
(45) Date of Patent: Jul. 4, 2017

(54) MEASUREMENT SYSTEM

(71) Applicant: KYOCERA CORPORATION, Kyoto (JP)

(72) Inventor: Tomohiro Inagaki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/905,121

(22) PCT Filed: Jul. 10, 2014

(86) PCT No.: PCT/JP2014/003677
§ 371 (c)(1),
(2) Date: Jan. 14, 2016

(87) PCT Pub. No.: WO2015/011891
PCT Pub. Date: Jan. 29, 2015

(65) Prior Publication Data

US 2016/0165359 A1 Jun. 9, 2016

(30) Foreign Application Priority Data

Jul. 25, 2013 (JP) ................................ 2013-155037

(51) Int. Cl.
*H04R 25/00* (2006.01)
*H04R 29/00* (2006.01)
*G01H 17/00* (2006.01)

(52) U.S. Cl.
CPC ............ *H04R 25/30* (2013.01); *H04R 29/00* (2013.01)

(58) Field of Classification Search
None
See application file for complete search history.

(56) References Cited

U.S. PATENT DOCUMENTS 4,586,194 A * 4/1986 Kohashi ............... H04R 29/001
381/60
5,624,377 A 4/1997 Davis
(Continued)

FOREIGN PATENT DOCUMENTS

JP S58-198338 A 11/1983
JP H11-500284 A 1/1999
(Continued)

OTHER PUBLICATIONS

International Search Report; PCT/JP2014/003677; mailed Oct. 21, 2014.

(Continued)

*Primary Examiner* — Curtis Kuntz
*Assistant Examiner* — Kenny Truong
(74) *Attorney, Agent, or Firm* — Studebaker & Brackett PC

(57) ABSTRACT

A measurement system includes an ear model including an artificial auricle (51) and an artificial external ear canal (53); and an air-conducted sound gauge (200) that measures air-conducted sound in the artificial external ear canal (53), and while an acoustic device (1) that includes a vibrating body and transmits sound to a user by contacting the vibrating body to a human auricle is placed in contact with the ear model (50) of the measurement system, the measurement system executes control for measurement, with the air-conducted sound gauge, of harmonics in an air-conducted component generated by a pure tone emitted by the acoustic device (1) and control to display the result of the measurement on a display.

12 Claims, 17 Drawing Sheets

(56) References Cited

U.S. PATENT DOCUMENTS

| | | | | |
|---|---|---|---|---|
| 5,771,298 | A * | 6/1998 | Davis | H04R 25/30 381/151 |
| 6,504,935 | B1 * | 1/2003 | Jackson | G10H 1/125 381/61 |
| 2010/0312496 | A1 * | 12/2010 | Armitage | G01N 29/043 702/39 |
| 2012/0177207 | A1 * | 7/2012 | Chang | H04R 29/00 381/56 |

FOREIGN PATENT DOCUMENTS

| | | |
|---|---|---|
| JP | 2004-179965 A | 6/2004 |
| JP | 2005-348193 A | 12/2005 |

OTHER PUBLICATIONS

Written Opinion of the International Searching Authority with Concise Explanation; PCT/JP2014/003677; Oct. 21, 2014.

* cited by examiner

FIG. 13A

500Hz ▼

| | 2nd | 3rd | 4th | 5th | 6th | 7th | 8th | 9th | 10th | 11th | 12th |
|---|---|---|---|---|---|---|---|---|---|---|---|
| [Hz] | 1000 | 1500 | 2000 | 2500 | 3000 | 3500 | 4000 | 4500 | 5000 | 5500 | 6000 |
| [dBV] | -38 | -42 | -49 | -42 | -45 | -27 | -43 | -31 | -43 | -36 | -34 |

FIG. 13B

500Hz ▼

| | 1st | 2nd | 3rd | 4th | 5th | 6th | 7th | 8th | 9th | 10th | 11th | 12th |
|---|---|---|---|---|---|---|---|---|---|---|---|---|
| [Hz] | 500 | 1000 | 1500 | 2000 | 2500 | 3000 | 3500 | 4000 | 4500 | 5000 | 5500 | 6000 |
| [dBSPL] | 90 | 52 | 48 | 41 | 48 | 45 | 63 | 47 | 59 | 47 | 54 | 56 |

FIG. 14A

1600Hz ▼

| 2nd | 3rd | 4th | 5th | 6th | 7th | 8th | 9th | 10th | 11th | 12th | |
|---|---|---|---|---|---|---|---|---|---|---|---|
| 3200 | 4800 | 6400 | – | – | – | – | – | – | – | – | [Hz] |
| -44 | -50 | -48 | – | – | – | – | – | – | – | – | [dBV] |

FIG. 14B

500Hz ▼

| 2nd | 3rd | 4th | 5th | 6th | 7th | 8th | 9th | 10th | 11th | 12th | |
|---|---|---|---|---|---|---|---|---|---|---|---|
| 1000 | 1500 | 2000 | 2500 | 3000 | 3500 | 4000 | 4500 | 5000 | 5500 | 6000 | [Hz] |
| -38 | -42 | -49 | -42 | -45 | -27 | -43 | -31 | -43 | -36 | -34 | [dBV] |

Displayed in green

MEASUREMENT SYSTEM

CROSS-REFERENCE TO RELATED APPLICATION

This application claims priority to and the benefit of Japanese Patent Application No. 2013-155037 filed Jul. 25, 2013, the entire contents of which are incorporated herein by reference.

TECHNICAL FIELD

This disclosure relates to a measurement system for evaluating an electronic device that is configured to transmit sound to a user based on vibration of a vibrating body, held in a housing, by pressing the vibrating body against a human ear.

BACKGROUND

JP 2005-348193 A (PTL 1) discloses an electronic device, such as a mobile phone or the like, that transmits air-conducted sound and bone-conducted sound to a user. As the air-conducted sound, PTL 1 discloses a sound that is transmitted to the user's auditory nerve by air vibrations, caused by a vibrating object, that are transmitted through the external ear canal to the eardrum and cause the eardrum to vibrate. As the bone-conducted sound, PTL 1 discloses a sound that is transmitted to the user's auditory nerve through a portion of the user's body (such as the cartilage of the outer ear) that is contacting a vibrating object.

In the telephone disclosed in PTL 1, a rectangular plate-shaped vibrating body, formed from a piezoelectric bimorph and a flexible substance, is attached to an outer surface of a housing via an elastic member. PTL 1 discloses that when voltage is applied to the piezoelectric bimorph in the vibrating body, the piezoelectric material expands and contracts in the longitudinal direction, causing the vibrating body to undergo bending vibration, and air-conducted sound and bone-conducted sound are transmitted to the user when the user contacts the vibrating body to the auricle.

CITATION LIST

Patent Literature

PTL 1: JP 2005-348193 A

SUMMARY

Technical Problem

As disclosed in PLT 1, in order to evaluate an electronic device that transmits bone-conducted sound through cartilage of the outer ear and air-conducted sound to a user, the sound pressure and the amount of vibration acting on a human auditory nerve due to vibration of a vibrating body need to be measured by approximation. The following two methods of measurement are methods for measuring the amount of vibration.

The first method of measurement is to measure the amount of vibration as voltage by pressing the vibrating body targeted for measurement against an artificial mastoid, for bone-conducted vibrating element measurement, that mechanically simulates the mastoid process behind the ear. The second method of measurement is to measure the amount of vibration as voltage by pressing a vibration pickup, such as a piezoelectric acceleration pickup, against the vibrating body targeted for measurement.

The measured voltage obtained with the first method of measurement is a voltage mechanically weighted for characteristics of a human body when the vibrating body is pressed against the mastoid process behind a human ear. This is not a voltage weighted for characteristics of vibration transmission when the vibrating body is pressed against a human ear. The measured voltage obtained with the second method of measurement measures the amount of vibration of the vibrating body directly. Similarly, this is not a voltage weighted for characteristics of vibration transmission in a human ear. Therefore, an electronic device that transmits bone-conducted sound through cartilage of the outer ear and air-conducted sound to a user cannot be properly evaluated by measuring the amount of vibration of the vibrating body with the above methods of measurement.

It would therefore be helpful to provide a measurement system that can measure an amount of vibration weighted for the characteristics of vibration transmission in a human ear and that can properly evaluate an electronic device that includes a vibrating body.

Solution to Problem

A measurement system of this disclosure includes an ear model including an artificial auricle and an artificial external ear canal; and an air-conducted sound gauge configured to measure air-conducted sound in the artificial external ear canal, such that while an acoustic device that includes a vibrating body and transmits sound to a user by contacting the vibrating body to a human auricle is placed in contact with the ear model, the measurement system executes control for measurement, with the air-conducted sound gauge, of harmonics in an air-conducted component generated by a pure tone emitted by the acoustic device and control to display a result of the measurement on a display.

Advantageous Effect

According to this disclosure, an amount of vibration weighted for characteristics of vibration transmission in a human ear can be measured, and an electronic device that includes a vibrating body can be properly evaluated.

BRIEF DESCRIPTION OF THE DRAWINGS

In the accompanying drawings:

FIGS. 13A and 13B illustrate an example of displaying the result of measuring harmonics with the microphone of an acoustic device measured with the measurement system according to Embodiment 2;

FIGS. 14A and 14B illustrate another example of displaying the measurement results in FIGS. 13A and 13B;

DETAILED DESCRIPTION

The following describes embodiments with reference to the drawings.

Embodiment 1

The measurement system disclosed herein can measure predetermined harmonics with respect to a fundamental frequency when measuring either or both of air-conducted sound and human body vibration sound generated by a certain type of acoustic device that generates vibration. Furthermore, this measurement system displays the harmonics on a display.

Structure and Operations of Measurement System

Figure 1:
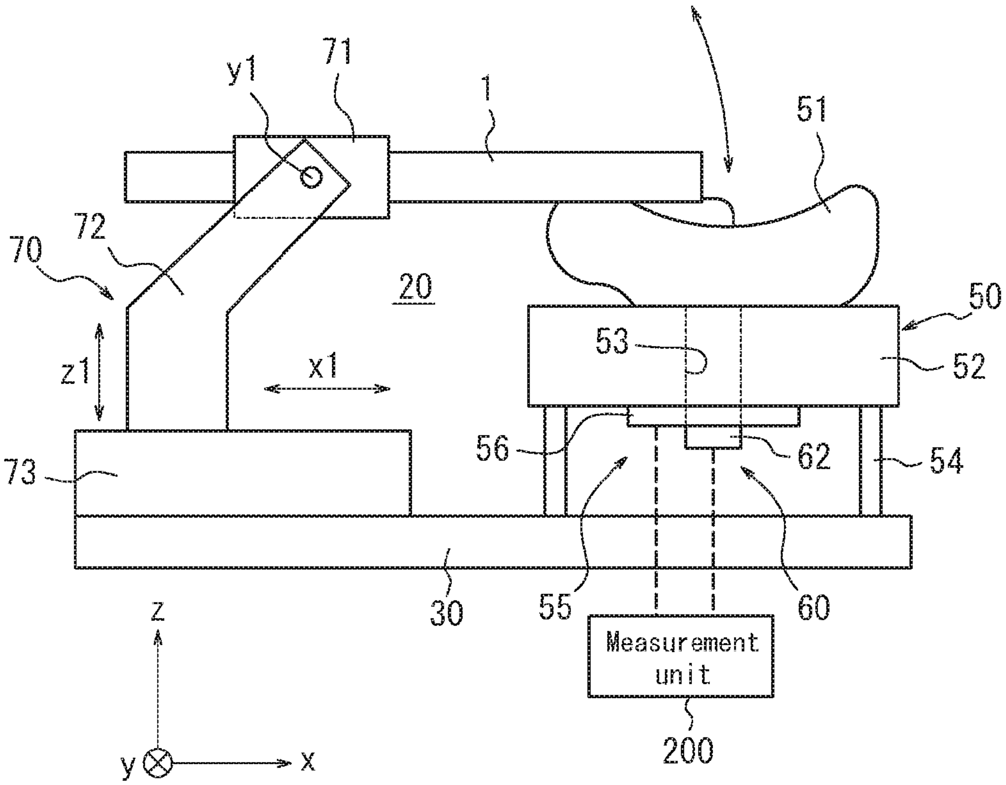
FIG. 1 schematically illustrates the structure of a measurement system according to Embodiment 1.

FIG. 1 schematically illustrates the structure of a measurement system 10 according to Embodiment 1. The measurement system 10 includes an acoustic device mount 20 and a measurement unit 200. The acoustic device mount 20 is provided with an ear model 50 supported by a base 30 and with a holder 70 that supports an acoustic device 1 targeted for measurement. The acoustic device 1 in FIG. 1 is a hearing aid incorporating an actuator such as a piezoelectric element or is a mobile phone, such as a smartphone, that includes a panel on a surface of a rectangular housing, with the panel vibrating as a vibrating body. First, the structure of the acoustic device mount 20 is described.

The ear model 50 is modeled after a human ear and includes an artificial auricle 51 and an artificial external ear canal unit 52 joined to the artificial auricle 51. The artificial external ear canal unit 52 is large enough to cover the artificial auricle 51 and has an artificial external ear canal 53 formed in the central region thereof. The ear model 50 is supported by the base 30 via a support member 54 at the periphery of the artificial external ear canal unit 52.

The ear model 50 is made from similar material to the material of an average artificial auricle used in, for example, a manikin such as a Head And Torso Simulator (HATS), Knowles Electronic Manikin for Acoustic Research (KEMAR), or the like, such as material conforming to IEC 60318-7. This material may, for example, be formed with a material such as rubber having a Shore hardness of 35 to 55. The material may also be softer than a Shore hardness of 35, such as a Shore hardness of approximately 15 to 30. The Shore hardness may, for example, be measured in conformity with International Rubber Hardness Degrees (IRHD/M) conforming to JIS K 6253, ISO 48, or the like. As a hardness measurement system, a fully automatic IRHD/M micro-size international rubber hardness gauge GS680 by Teclock Corporation may suitably be used. Considering the variation in ear hardness due to age, as a rule of thumb, approximately two or three types of the ear model 50 with a different hardness may be prepared and used interchangeably.

The thickness of the artificial external ear canal unit 52, i.e. the length of the artificial external ear canal 53, corresponds to the length up to the human eardrum (cochlea) and for example is suitably set in a range of 20 mm to 40 mm. In this embodiment, the length of the artificial external ear canal 53 is approximately 30 mm.

In the ear model 50, a vibration gauge 55 is disposed on the end face of the artificial external ear canal unit 52 on the opposite side from the artificial auricle 51, at a position in the peripheral portion of the opening of the artificial external ear canal 53. The vibration gauge 55 detects the amount of vibration transmitted through the artificial external ear canal unit 52 when the vibrating body of the acoustic device 1 is placed against the ear model 50. The vibration gauge 55 detects the amount of vibration corresponding to the human body vibration sound component that is heard without passing through the eardrum when the vibrating body of the acoustic device 1 is pressed against a human ear and vibration of the vibrating body of the acoustic device 1 directly vibrates the inner ear. Human body vibration sound is sound that is transmitted to the user's auditory nerve through a portion of the user's body (such as the cartilage of the outer ear) that is contacting a vibrating object. The vibration gauge 55 is, for example, configured using a vibration detection element 56 that has flat output characteristics in the measurement frequency range of the acoustic device 1 (for example, from 0.1 kHz to 30 kHz), is lightweight, and can accurately measure even slight vibrations. An example of this vibration detection element 56 is a piezoelectric acceleration pickup or other such vibration pickup, such as the vibration pickup PV-08A produced by Rion Corporation or the like.

Figure 2A:
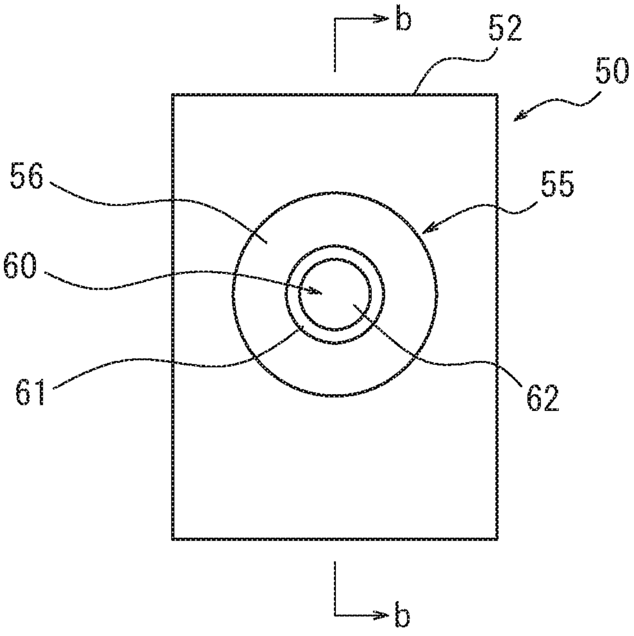
FIGS. 2A and 2B are detailed partial diagrams of the ear model in FIG. 1.

FIG. 2A is a plan view of the ear model 50 from the base 30 side. While FIG. 2A illustrates an example of providing a ring-shaped vibration detection element 56 that surrounds the peripheral portion of the opening of the artificial external ear canal 53, a plurality of vibration detection elements 56 may be provided instead of only one. In the case of providing a plurality of vibration detection elements 56, the vibration detection elements may be disposed at appropriate intervals at the periphery of the artificial external ear canal 53, or two arc-shaped vibration detection elements may be disposed as an arc surrounding the periphery of the opening in the artificial external ear canal 53. While the artificial external ear canal unit 52 is rectangular in FIG. 2A, the artificial external ear canal unit 52 may be any shape.

A sound pressure gauge 60 is disposed in the ear model 50. The sound pressure gauge 60 measures the sound pressure of sound propagating through the artificial external ear canal 53. The sound pressure gauge 60 measures the sound pressure produced when the vibrating body of the acoustic device 1 is pressed against a human ear. This sound pressure includes sound pressure corresponding to air-conducted sound that is heard directly through the eardrum by air vibrating due to vibration of the vibrating body of the acoustic device 1 and sound pressure corresponding to air-conducted sound representing sound, heard through the eardrum, that is produced in the ear itself by the inside of the external ear canal vibrating due to vibration of the vibrating body of the acoustic device 1. Air-conducted sound is sound transmitted to the user's auditory nerve by air vibrations, caused by a vibrating object, that are transmitted through the external ear canal to the eardrum and cause the eardrum to vibrate.

Figure 2B:
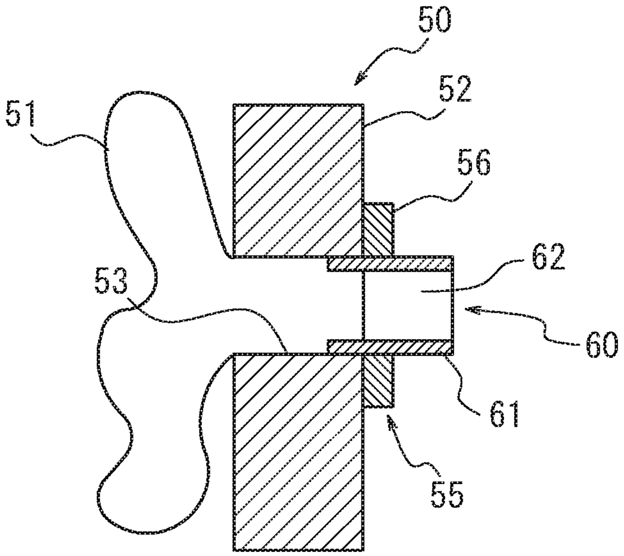

As illustrated by the cross-sectional view in FIG. 2B along the b-b line in FIG. 2A, the sound pressure gauge 60 includes a microphone 62 held by a tube member 61 that extends from the outer wall (peripheral wall of the hole) of the artificial external ear canal 53 through the opening of the ring-shaped vibration detection element 56. The microphone 62 may, for example, have flat output characteristics in the measurement frequency range of the acoustic device 1 and is preferably configured using a measurement capacitor microphone that has a low self-noise level. If the microphone 62 is properly corrected, non-flat output characteristics pose no problem. The capacitor microphone UC-53A produced by Rion Corporation may, for example, be used as the microphone 62. The microphone 62 is disposed so that the sound pressure detection face nearly matches the end face of the artificial external ear canal unit 52. The microphone 62 may, for example, be supported by the artificial external ear canal unit 52 or the base 30 and disposed in a floating state with respect to the outer wall of the artificial external ear canal 53.

Next, the holder 70 is described. The holder 70 is provided with a support 71 that supports both sides of the acoustic device 1. The support 71 is attached to one end of an arm 72 so as to be rotatable about an axis y1, which is parallel to the y-axis, in a direction to press the acoustic device 1 against the ear model 50. The other end of the arm 72 is joined to a movement adjuster 73 provided on the base 30. The movement adjuster 73 can adjust movement of the arm 72 in a vertical direction x1 of the acoustic device 1 supported by the support 71, the direction x1 being parallel to the x-axis that is orthogonal to the y-axis, and in a direction z1 that presses the acoustic device 1 against the ear model 50, the direction z1 being parallel to the z-axis that is orthogonal to the y-axis and the x-axis.

In the acoustic device 1 supported by the support 71, the pressing force, against the ear model 50, of the vibrating body is adjusted by rotating the support 71 about the axis y1 or by moving the arm 72 in the z1 direction. In this embodiment, the pressing force is adjusted in a range of 0 N to 10 N. Of course, the support 71 may also be configured to rotate freely about other axes in addition to the y1 axis.

The reason for the range from 0 N to 10 N is to allow measurement over a range that is sufficiently wider than the pressing force that is envisioned when a human presses the electronic device against an ear, for example to converse. The case of 0 N may, for example, include not only the case of contacting without pressing against the ear model 50, but also the case of holding the acoustic device 1 at a distance from the ear model 50 in increments of 1 cm and measuring at each distance. This approach also allows measurement with the microphone 62 of the degree of damping of air-conducted sound due to distance, thus making the measurement system more convenient.

By adjusting the arm 72 in the x1 direction, the contact position of the acoustic device 1 with respect to the ear model 50 can be adjusted so that, for example, the vibrating body covers nearly the entire ear model 50, or so that the vibrating body covers a portion of the ear model 50, as illustrated in FIG. 1. The arm 72 may also be configured to allow adjustment of the acoustic device 1 to a variety of contact positions with respect to the ear model 50 by making movement of the arm 72 adjustable in a direction parallel to the y-axis, or by making the arm 72 rotatable about an axis parallel to the x-axis or the z-axis. The vibrating body is not limited to an object like a panel that widely covers the ear, and for example an acoustic device having a protrusion or corner that transmits vibration to only a portion of the ear model 50, such as the tragus, may be targeted for measurement.

Figure 3:
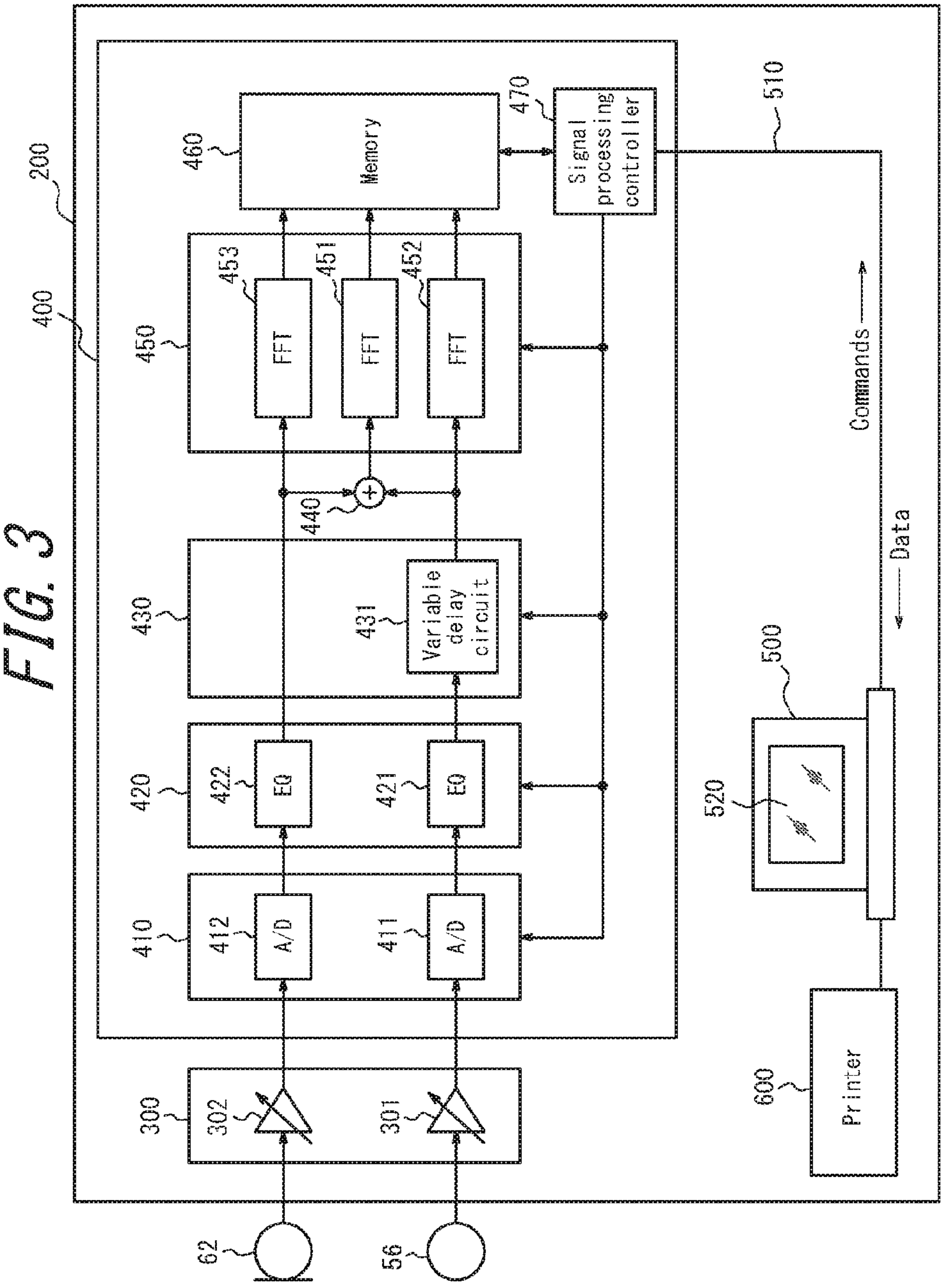
FIG. 3 is a functional block diagram illustrating the structure of a section of the measurement unit in FIG. 1.

Next, the structure of the measurement unit 200 in FIG. 1 is described. FIG. 3 is a functional block diagram illustrating the structure of a section of the measurement unit 200. The measurement unit 200 measures the amount of vibration and the sound pressure transmitted through the ear model 50 by vibration of the acoustic device 1 targeted for measurement, i.e. sensory sound pressure that combines human body vibration sound and air-conducted sound, and includes a sensitivity adjuster 300, signal processor 400, personal computer (PC) 500, and printer 600.

Output of the vibration detection element 56 and the microphone 62 is provided to the sensitivity adjuster 300. The sensitivity adjuster 300 includes a variable gain amplifier circuit 301 that adjusts the amplitude of the output of the vibration detection element 56 and a variable gain amplifier circuit 302 that adjusts the amplitude of the output of the microphone 62. The variable gain amplifier circuits 301 and 302 independently adjust the amplitude of corresponding analog input signals to a required amplitude either manually or automatically. Error in the sensitivity of the vibration detection element 56 and the sensitivity of the microphone 62 is thus corrected. The variable gain amplifier circuits 301 and 302 are configured to allow adjustment of the amplitude of the input signals over a range of, for example, ±20 dB.

Output of the sensitivity adjuster 300 is input into the signal processor 400. The signal processor 400 includes an A/D converter 410, frequency characteristic adjuster 420, phase adjuster 430, output combiner 440, frequency analyzer 450, memory 460, and signal processing controller 470. The A/D converter 410 includes an A/D conversion circuit (A/D) 411 that converts the output of the variable gain amplifier circuit 301 into a digital signal and an A/D conversion circuit (A/D) 412 that converts the output of the variable gain amplifier circuit 302 into a digital signal. The A/D converter 410 thus converts the corresponding analog input signals into digital signals. The A/D conversion circuits 411 and 412 are, for example, 16 bits or more and can support 96 dB or more by dynamic range conversion. The A/D conversion circuits 411 and 412 may be configured so that the dynamic range is changeable.

Output of the A/D converter 410 is provided to the frequency characteristic adjuster 420. The frequency characteristic adjuster 420 includes an equalizer (EQ) 421 that adjusts the frequency characteristics of the detection signal from the vibration detection element 56, i.e. the output of the A/D conversion circuit 411, and an equalizer (EQ) 422 that adjusts the frequency characteristics of the detection signal from the microphone 62, i.e. the output of the A/D conversion circuit 412. The equalizers 421 and 422 independently adjust the frequency characteristics of the respective input signals to frequency characteristics near the auditory sensation of the human body either manually or automatically. The equalizers 421 and 422 may, for example, be configured with a graphical equalizer having a plurality of bands, a low pass filter, a high pass filter, or the like. The order in which the equalizers (EQ) and the A/D conversion circuits are disposed may be reversed.

Output of the frequency characteristic adjuster 420 is provided to the phase adjuster 430. The phase adjuster 430 includes a variable delay circuit 431 that adjusts the phase of the detection signal from the vibration detection element 56, i.e. the output of the equalizer 421. Since the speed of sound transmitted through the material of the ear model 50 is not exactly the same as the speed of sound transmitted through human muscle or bone, it is assumed that the phase relationship between the output of the vibration detection element 56 and the output of the microphone 62 will be shifted from that of a human ear, the shift being greater at high frequencies.

Figure 4A:
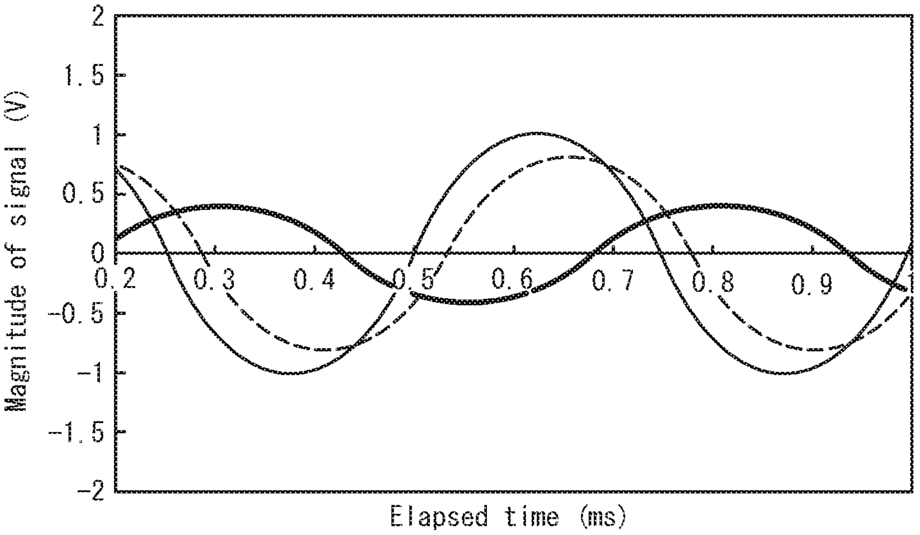
FIGS. 4A and 4B illustrate the phase relationship between output of the vibration detection element and output of the microphone in FIG. 3.
Figure 4B:
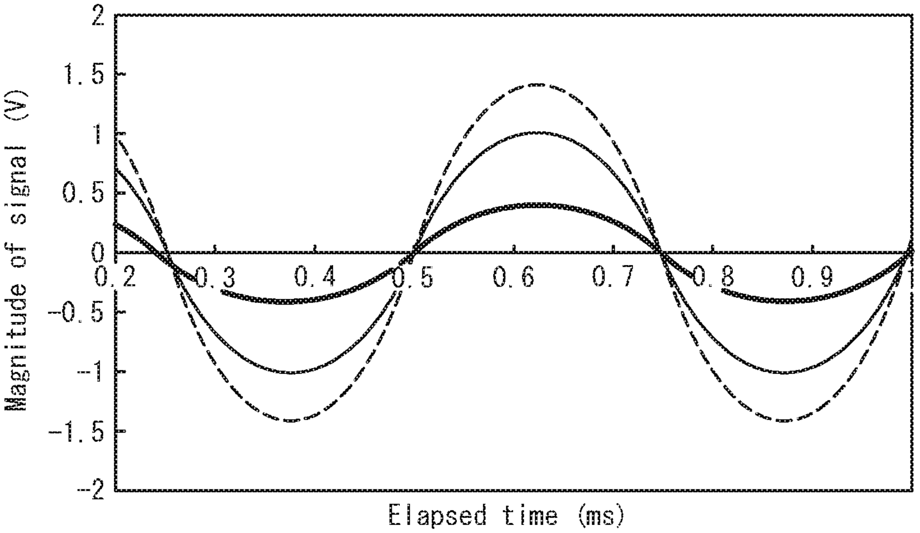

If the phase relationship between the output of the vibration detection element 56 and the output of the microphone 62 shifts greatly, then upon combining the two outputs with the below-described output combiner 440, amplitude peaks and dips may appear at different values than in actuality, and the combined output may be amplified or diminished. For example, if the transmission speed of sound detected by the microphone 62 is approximately 0.2 ms slower than the transmission speed of vibration detected by the vibration detection element 56, then the combined output of both as sinusoidal vibration at 2 kHz is as illustrated in FIG. 4A, and amplitude peaks and dips appear at unnatural times. By contrast, the combined output when there is no misalignment in the transmission speeds is as illustrated in FIG. 4B, and amplitude peaks and dips appear at predetermined times. In FIGS. 4A and 4B, the bold line indicates a vibration waveform detected by the vibration detection element 56, the thin line indicates a sound pressure waveform detected by the microphone 62, and the dashed line indicates the waveform of the combined output.

In this embodiment, in accordance with the measurement frequency range of the acoustic device 1 targeted for measurement, the phase of the detection signal from the vibration detection element 56, which is the output of the equalizer 421, is adjusted over a predetermined range by the variable delay circuit 431. For example, in the case of the measurement frequency range of the acoustic device 1 being from 100 Hz to 10 kHz, the phase of the detection signal from the vibration detection element 56 is adjusted by the variable delay circuit 431 over a range of approximately ±10 ms (corresponding to ±100 Hz) at least in increments smaller than 0.1 ms (corresponding to 10 kHz). In the case of a human ear as well, phase misalignment occurs between human body vibration sound and air-conducted sound. Therefore, phase adjustment by the variable delay circuit 431 does not refer to matching the phase of the detection signals from both the vibration detection element 56 and the microphone 62, but rather to matching the phase of these detection signals to the actual auditory sensation by the ear.

Output of the phase adjuster 430 is provided to the output combiner 440. The output combiner 440 combines the detection signal from the vibration detection element 56, after phase adjustment by the variable delay circuit 431, with the detection signal, from the microphone 62, that has passed through the phase adjuster 430. This allows approximation of the human body in obtaining sensory sound pressure that combines the amount of vibration and the sound pressure, i.e. the human body vibration sound and the air-conducted sound, transmitted by vibration of the acoustic device 1 targeted for measurement.

The combined output of the output combiner 440 is input into the frequency analyzer 450. The frequency analyzer 450 includes a Fast Fourier Transform (FFT) 451 that performs frequency analysis on the combined output of the output combiner 440. In this way, power spectrum data corresponding to the sensory sound pressure (air+vib), in which the human body vibration sound (vib) and the air-conducted sound (air) are combined, are obtained from the FFT 451.

The frequency analyzer 450 is provided with FFTs 452 and 453 that respectively perform frequency analysis on the signals before combination by the output combiner 440, i.e. on the detection signal, from the vibration detection element 56, that has passed through the phase adjuster 430 and the detection signal from the microphone 62. In this way, power spectrum data corresponding to the human body vibration sound (vib) are obtained from the FFT 452, and power spectrum data corresponding to the air-conducted sound (air) are obtained from the FFT 453.

In the FFTs 451 to 453, analysis points are set for the frequency component (power spectrum) in correspondence with the measurement frequency range of the acoustic device 1. For example, when the measurement frequency range of the acoustic device 1 is 100 Hz to 10 kHz, analysis points are set so as to analyze the frequency component at each point when dividing the interval in a logarithmic graph of the measurement frequency range into 100 to 200 equal portions.

The output of the FFTs 451 to 453 is stored in the memory 460. The memory 460 has the capacity of at least a double buffer that can store a plurality of analysis data sets (power spectrum data) for each of the FFTs 451 to 453. The memory 460 is configured always to allow transmission of the latest data upon a data transmission request from the below-described PC 500.

The signal processing controller 470 is connected to the PC 500 via a connection cable 510 for an interface such as USB, RS-232C, SCSI, PC card, or the like. Based on commands from the PC 500, the signal processing controller 470 controls operations of each portion of the signal processor 400. The signal processor 400 may be configured as software executed on any suitable processor, such as a Central Processing Unit (CPU), or may be configured with a Digital Signal Processor (DSP).

The PC 500 includes an application to evaluate the acoustic device 1 with the measurement system 10. The evaluation application is, for example, copied from a CD-ROM or downloaded over a network or the like. The PC 500 for example displays an application screen on a display 520 based on the evaluation application. Based on information input via the application screen, the PC 500 transmits a command to the signal processor 400. The PC 500 receives a command response and data from the signal processor 400, and based on the received data, executes predetermined processing and displays the measurement results on the application screen, while also outputting the measurement results to the printer 600 as necessary for printing.

In FIG. 3, the sensitivity adjuster 300 and the signal processor 400 are, for example, mounted on the base 30 of the acoustic device mount 20. The PC 500 and the printer 600 are, for example, disposed separately from the base 30. The signal processor 400 and the PC 500 are, for example, connected by the connection cable 510.

Figure 5:
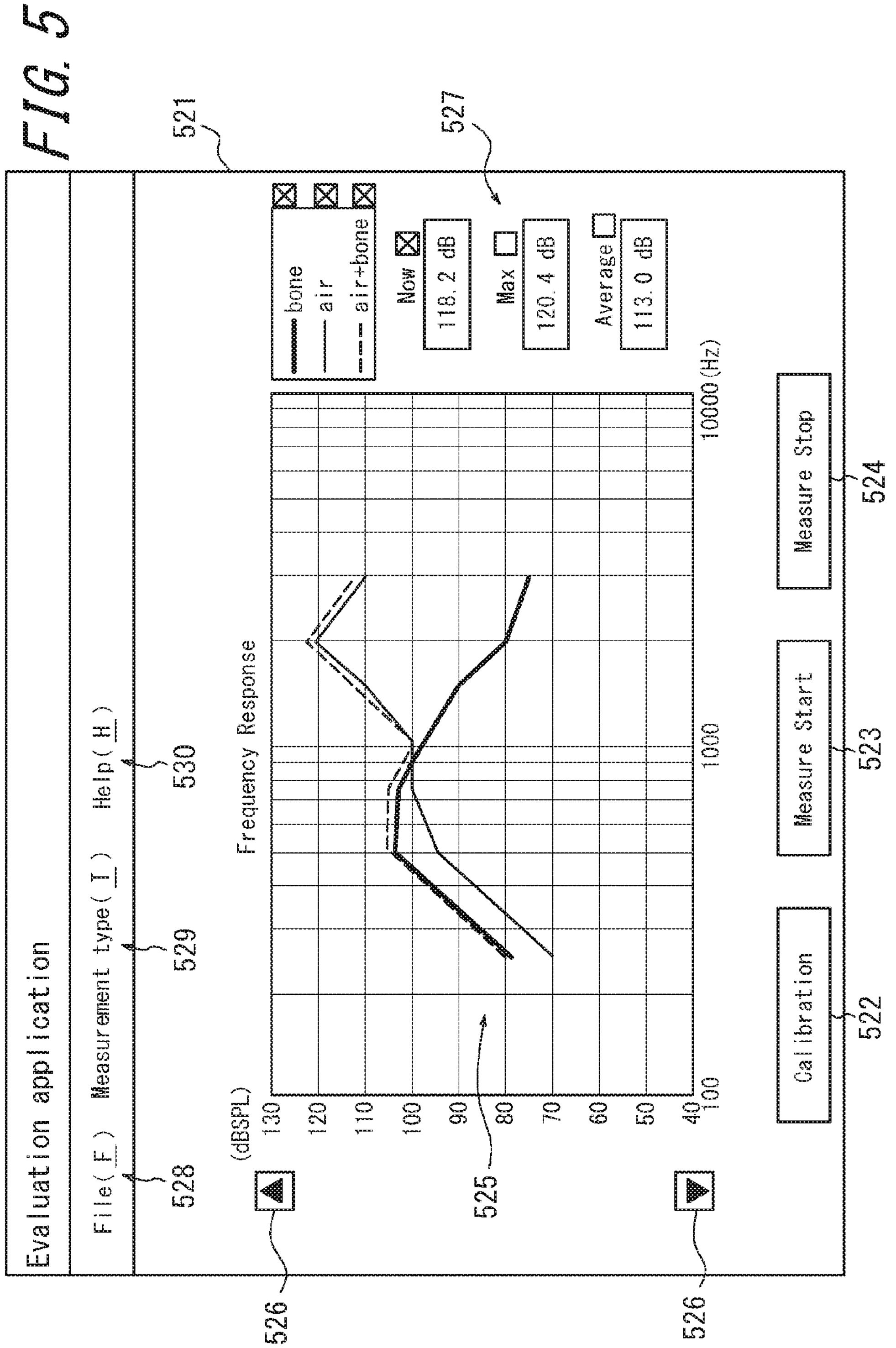
FIG. 5 illustrates an example of an application screen and of measurement results in the measurement system of FIG. 1.

FIG. 5 illustrates an example of an application screen displayed on the display 520. The application screen 521 in FIG. 5 includes a “Calibration” icon 522, a “Measure Start” icon 523, a “Measure Stop” icon 524, a measurement result display area 525, icons 526 to change the measurement range, a measurement result display selection area 527, a file icon 528, a measurement type icon 529, and a help icon 530. The following describes each function briefly.

The "Calibration" icon 522 corrects error in the sensitivity of the vibration detection element 56 and the microphone 62. In this correction mode, a reference device is set in the holder 70 and brought into contact with the ear model 50 at a reference position. When causing the reference device to vibrate in a predetermined vibration mode (for example, a pure tone or a multi-sine), the sensitivity of the vibration detection element 56 and of the microphone 62 is adjusted by the variable gain amplifier circuits 301 and 302 so that the power spectrum data of the detection signal from the vibration detection element 56 and the power spectrum data of the detection signal from the microphone 62 are within their respective normal error ranges.

The "Measure Start" icon 523 transmits a measurement start command to the signal processor 400 and continues to receive data until the end of measurement. The "Measure Stop" icon 524 transmits a measurement stop command to the signal processor 400 and ends data reception. Based on the received data, measurement results corresponding to the measurement mode selected with the measurement type icon 529 are displayed in the measurement result display area 525. FIG. 5 illustrates an example in which measurement results for the power spectra of vib (human body vibration sound), air (air-conducted sound), and air+vib (sensory sound pressure) in the power spectrum measurement mode are displayed in the measurement result display area 525. The icons 526 to change the measurement range shift the measurement range width of the power spectrum displayed in the measurement result display area 525 up and down by 10 dB increments and transmit a change measurement range command to the signal processor 400. As a result, the signal processor 400 changes the range of A/D conversion by the A/D conversion circuits 411 and 412 in response to the change measurement range command.

The measurement result display selection area 527 displays types of power spectra that can be displayed in the measurement result display area 525 and a selection box for each type, along with a display area and a selection box for each of the current value of the power spectrum (Now), the maximum value during measurement (Max), and the average value during measurement (Average). The power spectrum or high-frequency distortion rate are also displayed in the corresponding areas for the information selected with the selection boxes. The file icon 528 is, for example, for printing the application screen being displayed or for outputting the measurement results in a format such as CSV or EXCEL. The measurement type icon 529 switches between measurement modes, such as power spectrum measurement mode, high-frequency distortion rate measurement mode, and the like. The high-frequency distortion rate displayed in the measurement result display selection area 527 can be calculated in high-frequency distortion rate mode by the PC 500 based on measurement data from the signal processor 400. The help icon 530 displays help on how to use the measurement system 10.

The measurement system 10 of this embodiment evaluates the acoustic device 1 targeted for measurement by analyzing the frequency component in the combined output of the vibration detection element 56 and the microphone 62 while using a piezoelectric element, for example, to cause the vibrating body of the acoustic device 1 to vibrate. The piezoelectric element with which the vibrating body is configured may have a predetermined measurement frequency range of, for example, 100 Hz to 10 kHz as mentioned above and may be driven with a multi-drive signal wave that combines drive signals for every 100 Hz.

Figure 6:
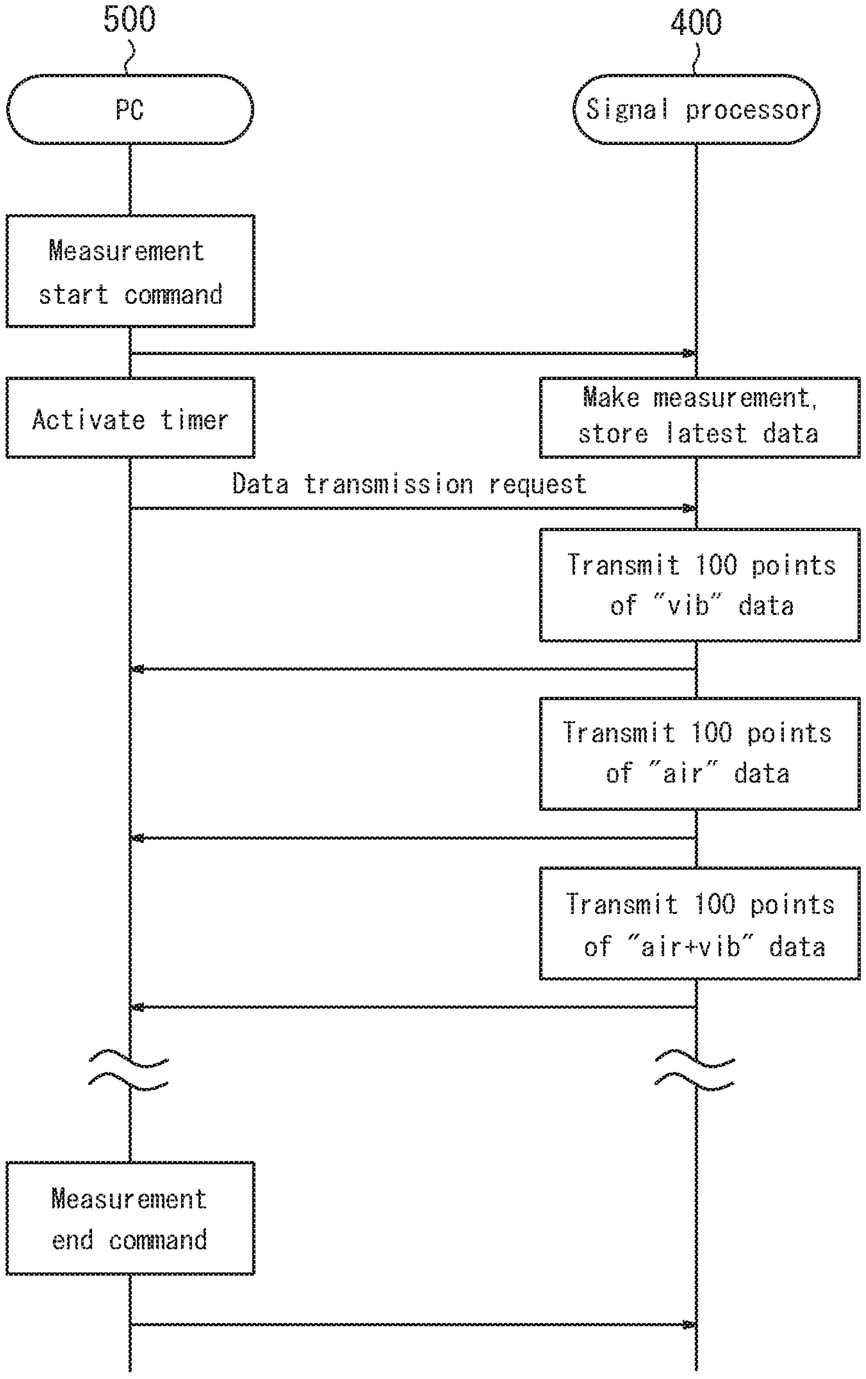
FIG. 6 is a flowchart illustrating an example of measurement operations by the measurement system of FIG. 1.

With reference to the flowchart in FIG. 6, the following describes an example of operations to measure the acoustic device 1 with the measurement system 10 according to this embodiment. Here, it is assumed that 100 points each of "air+vib" data, "vib" data, and "air" data are obtained with the FFTs 451 to 453 of the frequency analyzer 450.

First, upon the "Measure Start" icon 523 on the application screen 521 in FIG. 5 being pressed, the PC 500 transmits a measurement start command to the signal processor 400. Upon receiving the measurement start command, the signal processor 400 begins to measure the acoustic device 1. As a result, the signal processor 400 adjusts sensitivity of the output of the vibration detection element 56 and the microphone 62 with the sensitivity adjuster 300, then converts the results to digital signals with the A/D converter 410, adjusts the frequency characteristics with the frequency characteristic adjuster 420, and subsequently adjusts the phase with the phase adjuster 430 and combines the results with the output combiner 440. The signal processor 400 then performs frequency analysis on the combined output of the output combiner 440 with the FFT 451 of the frequency analyzer 450 and stores the power spectrum data for 100 points, i.e. the "air+vib" data, in the memory 460.

Simultaneously, the signal processor 400 performs frequency analysis with the FFT 452 on the detection signal from the vibration detection element 56, the phase of which was adjusted by the variable delay circuit 431 of the phase adjuster 430, and stores the power spectrum data for 100 points, i.e. the "vib" data, in the memory 460. Similarly, the signal processor 400 performs frequency analysis with the FFT 453 on the detection signal, from the microphone 62, that passed through the phase adjuster 430 and stores the power spectrum data for 100 points, i.e. the "air" data, in the memory 460.

The signal processor 400 repeats the FFT processing by the FFTs 451 to 453 at predetermined timings and stores the results in the memory 460. The memory 460 thus stores the data from the FFTs 451 to 453 by consecutively updating the data so as always to retain the latest data.

Subsequently, the PC 500 activates a timer at a predetermined timing and transmits a command for a data transmission request to the signal processor 400. Upon receiving the data transmission request from the PC 500, the signal processor 400 consecutively transmits 100 points each of the latest "vib" data, "air" data, and "air+vib" data stored in the memory 460 to the PC 500.

Until transmitting a measurement stop command to the signal processor 400, the PC 500 continues to transmit a command for the data transmission request to the signal processor 400 at each set time of the timer, thereby acquiring the latest "vib" data, "air" data, and "air+vib" data. Upon each acquisition of data from the signal processor 400, the PC 500 displays the measurement results on the application screen 521 in FIG. 5 based on the acquired data.

Subsequently, upon the "Measure Stop" icon 524 on the application screen 521 in FIG. 5 being pressed, the PC 500 transmits a measurement stop command to the signal processor 400. As a result, the PC 500 and the signal processor 400 stop measurement operations. The above-described results of measuring the acoustic device 1 are output from the printer 600 as necessary during or after the end of measurement of the acoustic device 1.

In the measurement system of this embodiment, the microphone 62 measures sound pressure passing through the ear model 50. Accordingly, the power spectrum corresponding to the air-conducted component measured based on output of the microphone 62 includes a combination of the sound pressure corresponding to the air-conducted component that is heard directly through the eardrum by air vibrating due to vibration of the acoustic device 1 and sound pressure corresponding to the air-conducted component representing sound, heard through the eardrum, that is produced in the ear itself by the inside of the external ear canal vibrating due to vibration of the acoustic device 1. In other words, the power spectrum corresponding to the air-conducted component measured with this embodiment is weighted for the characteristics of sound pressure transmission in a human ear.

Moreover, in the measurement system 10 of this embodiment, after the phases of the output corresponding to the human body vibration sound component from the vibration detection element 56 and the output corresponding to the air-conducted component from the microphone 62 are adjusted by the phase adjuster 430, the two outputs are combined by the output combiner 440 and subjected to frequency analysis by the frequency analyzer 450. Accordingly, the sensory sound pressure that combines the amount of vibration and the sound pressure conducted to the human body due to vibration of the acoustic device 1 targeted for measurement can be measured by approximating the human body. This approach allows evaluation of the acoustic device 1 to a high degree of accuracy and increases the reliability of the measurement system 10.

In this embodiment, the output corresponding to the human body vibration sound component from the vibration detection element 56 and the output corresponding to the air-conducted component from the microphone 62 are independently subjected to frequency analysis by the frequency analyzer 450, thereby allowing more detailed evaluation of the acoustic device 1. Furthermore, the sensitivity of the vibration detection element 56 and of the microphone 62 is adjusted by the sensitivity adjuster 300, thereby allowing measurement of sensory sound pressure by age or the like. Hence, the acoustic device 1 can be evaluated in accordance with the function of an individual's ear. Also, since the frequency characteristics of the output corresponding to the human body vibration sound component from the vibration detection element 56 and of the output corresponding to the air-conducted component from the microphone 62 can be adjusted independently with the frequency characteristic adjuster 420, the acoustic device 1 can be evaluated to a high degree of accuracy in accordance with the function of an individual's ear.

The pressing force on the ear model 50 by the acoustic device 1 targeted for measurement can be adjusted, as can the contact position, thus allowing a variety of forms of evaluating the acoustic device 1.

Structure of Acoustic Device

Figure 7A:
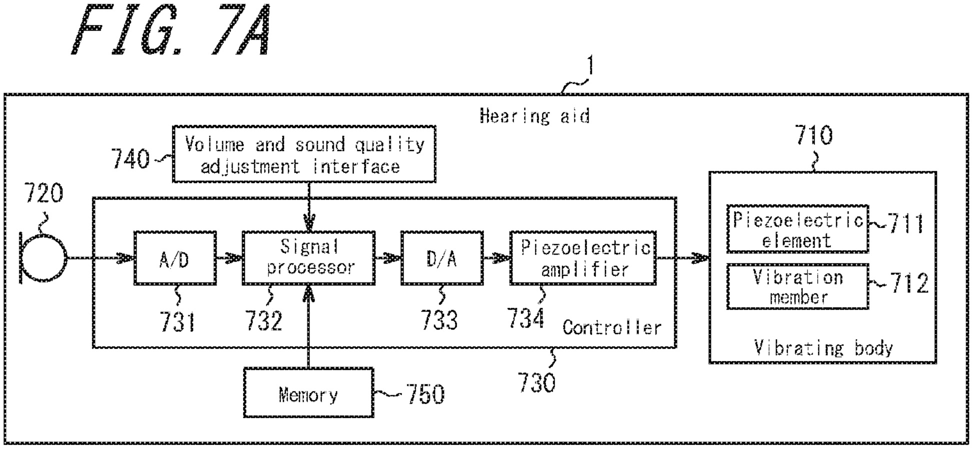
FIGS. 7A to 7C illustrate a hearing aid as an acoustic device.

Next, the vibration-generating type acoustic device that is targeted for measurement by the measurement system 10 of this disclosure is described briefly. The acoustic device 1 is, for example, a hearing aid. FIG. 7A is a functional block diagram schematically illustrating the structure of a section of a hearing aid 1. The hearing aid 1 includes a vibrating body 710, a microphone 720, a controller 730, a volume and sound quality adjustment interface 740, and a memory 750.

The vibrating body 710 includes a piezoelectric element 711 that flexes and a vibration member 712 that vibrates by being bent directly by the piezoelectric element.

The piezoelectric element 711 is formed by elements that, upon application of an electric signal (voltage), either expand and contract or bend (flex) in accordance with the electromechanical coupling coefficient of their constituent material. Ceramic or crystal elements, for example, may be used. The piezoelectric element 711 may be a unimorph, bimorph, or laminated piezoelectric element. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph bends upon the application of an electric signal (voltage).

The vibration member 712 is, for example, made from glass or a synthetic resin such as acrylic or the like. The vibration member 712 may be a silicone resin molded product. The vibration member is for example shaped as a plate. The shape of the vibration member 712 is described below as being a plate.

The microphone 720 collects sound from a sound source, namely sound reaching the user's ear.

The controller 730 executes various control pertaining to the hearing aid 1. The controller 730 applies a predetermined electric signal (a voltage corresponding to a sound signal) to the piezoelectric element 711. In greater detail, in the controller 730, an A/D converter (A/D) 731 converts a sound signal collected by the microphone 720 into a digital signal. Based on information on volume, sound quality, and the like from the volume and sound quality adjustment interface 740 and on information stored in the memory 750, a signal processor 732 outputs a digital signal that drives the vibrating body 710. A D/A converter (D/A) 733 converts the digital signal to an analog electric signal, which is then amplified by a piezoelectric amplifier 734. The resulting electric signal is applied to the piezoelectric element 711. The voltage that the controller 730 applies to the piezoelectric element 711 may, for example, be ±15 V. This is higher than the applied voltage of a dynamic speaker that is installed in a mobile phone for conduction of sound by air-conducted sound rather than human body vibration sound. In this way, sufficient vibration is generated in the vibration member, so that a human body vibration sound can be generated via a part of the user's body. The magnitude of the applied voltage used may be appropriately adjusted in accordance with the fixation strength of the vibration member 712 or the performance of the piezoelectric element 711. Upon the controller 730 applying the electric signal to the piezoelectric element 711, the piezoelectric element 711 expands and contracts or bends in the longitudinal direction. At this point, the vibration member 712 to which the piezoelectric element 711 is attached deforms in conjunction with the expansion and contraction or bending of the piezoelectric element 711. The vibration member 712 thus vibrates. The vibration member 712 flexes due to expansion and contraction or to bending of the piezoelectric element 711.

Figure 7B:
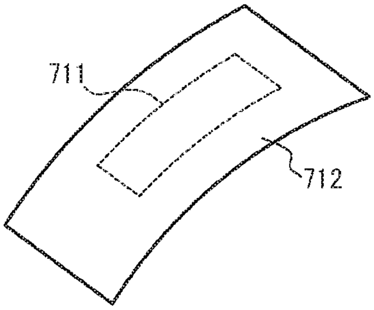

Since the vibration member 712 vibrates as described above, the vibration member 712 generates air-conducted sound, and when the user contacts the vibration member 712 to the tragus, the vibration member 712 generates human body vibration sound via the tragus. As illustrated in FIG. 7B, the vibration member 712 preferably vibrates with locations near the edges of the vibration member 712 as nodes and the central region as an antinode in response to expansion and contraction or bending of the piezoelectric element 711 in the longitudinal direction, and a location at the central region of the vibration member 712 preferably contacts the tragus or antitragus. As a result, vibration of the vibration member 712 can be efficiently transmitted to the tragus or the antitragus.

Figure 7C:
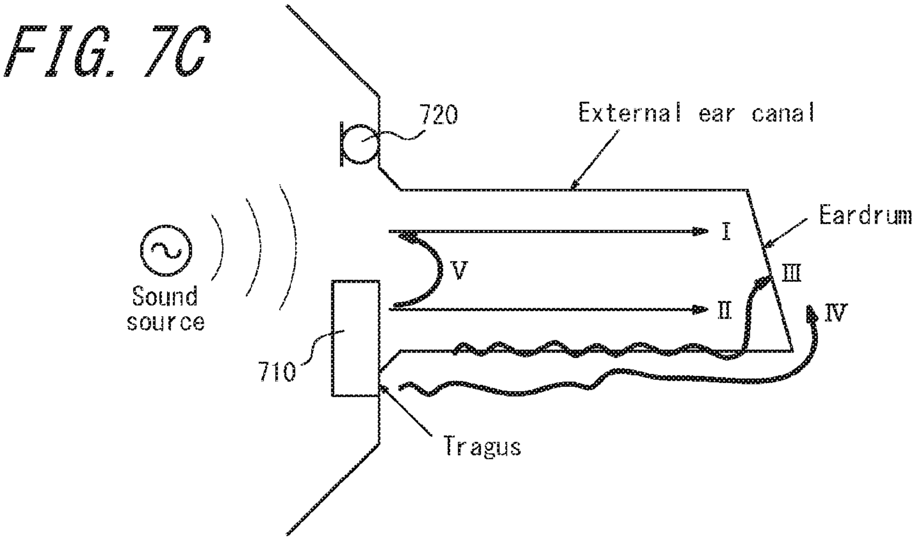

FIG. 7C schematically illustrates transmission of sound from the above-described hearing aid 1. In FIG. 7C, the only illustrated portions of the hearing aid 1 are the vibrating body 710 and the microphone 720. The microphone 720 collects sound from a sound source. By vibrating, the vibrating body 710 causes the user to hear the sound collected by the microphone 720.

As illustrated in FIG. 7C, sound from the sound source passes through the external ear canal from a portion not covered by the vibrating body 710 and reaches the eardrum directly (path I). Air-conducted sound due to vibration of the vibrating body 710 passes through the external ear canal and reaches the eardrum (path II). Due to the vibration of the vibrating body 710, at least the inner wall of the external ear canal vibrates, and air-conducted sound due to this vibration of the external ear canal (external ear canal radiated sound) reaches the eardrum (path III). Human body vibration sound due to the vibration of the vibrating body 710 reaches the auditory nerve directly without passing through the eardrum (path IV). A portion of the air-conducted sound produced by the vibrating body 710 escapes to the outside (path V).

Figure 8A:
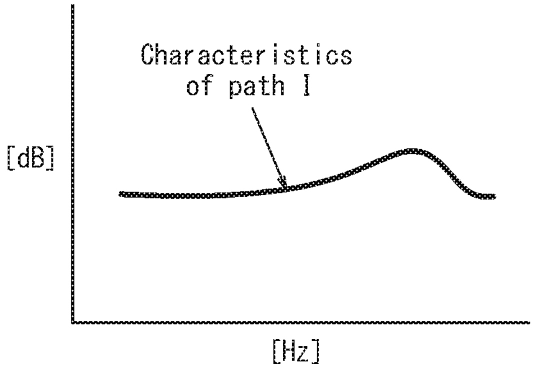
FIGS. 8A to 8D schematically illustrate acoustic characteristics of various paths of sound for the hearing aid in FIGS. 7A to 7C.
Figure 8B:
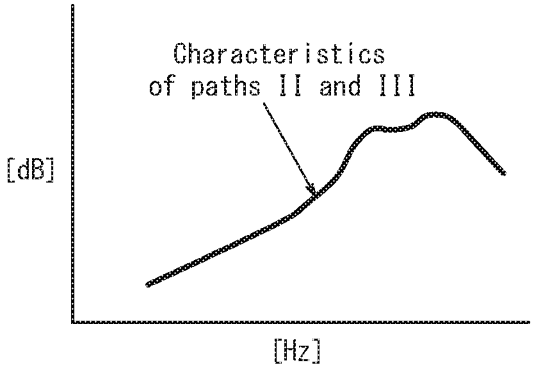
Figure 8C:
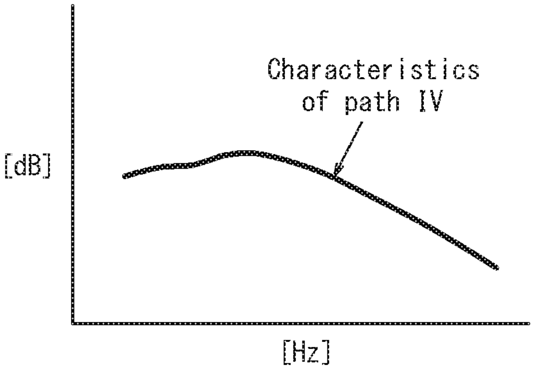
Figure 8D:
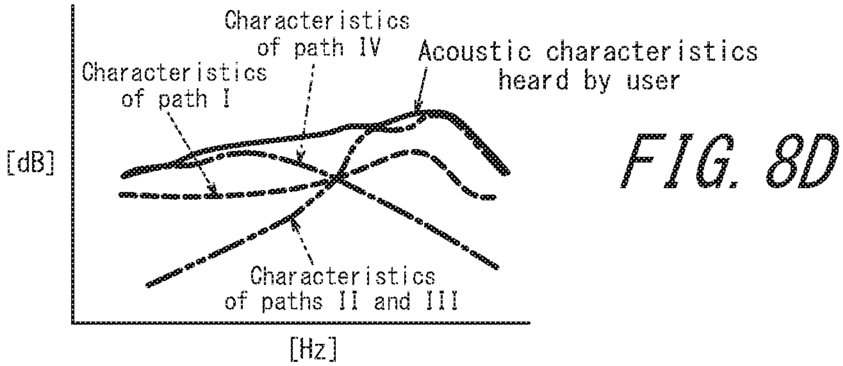

FIGS. 8A through 8D schematically illustrate the acoustic characteristics of the various paths. FIG. 8A illustrates the acoustic characteristics of sound by path I, and FIG. 8B illustrates the acoustic characteristics of sound by path II and path III. For the sound by path II and path III, the sound pressure in the low-frequency sound region is low, since low-frequency sound escapes by path V. FIG. 8C illustrates the acoustic characteristics of path IV. As illustrated in FIG. 8C, the human body vibration sound is low-frequency sound, i.e. vibration in a low-frequency region. Therefore, this sound does not dampen easily and hence is transmitted more easily than high-frequency sound. Accordingly, low-frequency sound is transmitted relatively well. FIG. 8D illustrates the acoustic characteristics for a combination of sounds by paths I through IV, i.e. the actual acoustic characteristics heard by a user wearing the hearing aid 1. As illustrated in FIG. 8D, even though sound pressure of low-frequency sound escapes to the outside by path V, the sound pressure of low-frequency sound, namely sound pressure of low-frequency sound at 1 kHz or less in this embodiment, can be guaranteed by the human body vibration sound. Therefore, a sense of volume can be maintained, as made clear by measurement.

Measurement of Acoustic Device with Measurement System

Figure 9:
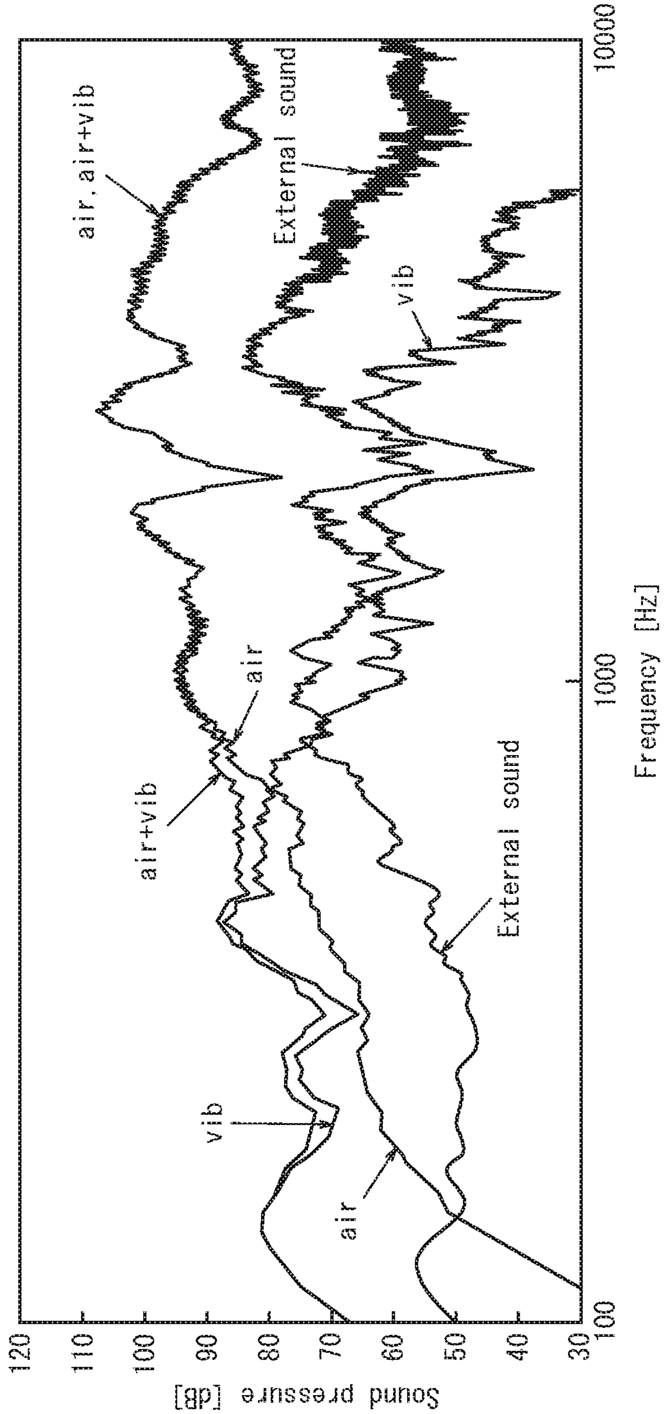
FIG. 9 illustrates measurement values of acoustic characteristics of an acoustic device measured with the measurement system in FIG. 1.

Next, the results of measuring the acoustic device 1 with the above-described measurement system 10 are described. The vibrating body 710 of the acoustic device 1 is preferably pressed against the ear model 50 of the measurement system 10 with a force of 0.05 N to 3 N. This is the range over which the vibrating body 710 of the acoustic device 1 is pressed against a human ear. The vibrating body 710 is more preferably pressed against the ear model 50 with a force of 0.1 N to 2 N. This is the range over which the vibrating body 710 of the acoustic device 1 is likely to be pressed against a human ear. Pressing the vibrating body 710 against the ear model 50 with a force of 0.1 N to 2 N yields measurement results (FIG. 9) more closely conforming to the actual form of use.

The area of the vibrating body 710 of the acoustic device 1 that contacts the ear model 50 of the measurement system 10 (contact area) is preferably from 0.1 $cm^2$ to 4 $cm^2$. This range of contact area is the range over which the vibrating body 10*a* of the acoustic device 1 contacts a human ear. The contact area is more preferably from 0.3 $cm^2$ to 3 $cm^2$. This is the range over which the vibrating body 710 of the acoustic device 1 is likely to contact a human ear. Setting the contact area to be from 0.3 $cm^2$ to 3 $cm^2$ yields measurement results more closely conforming to the actual form of use.

Figure 10:
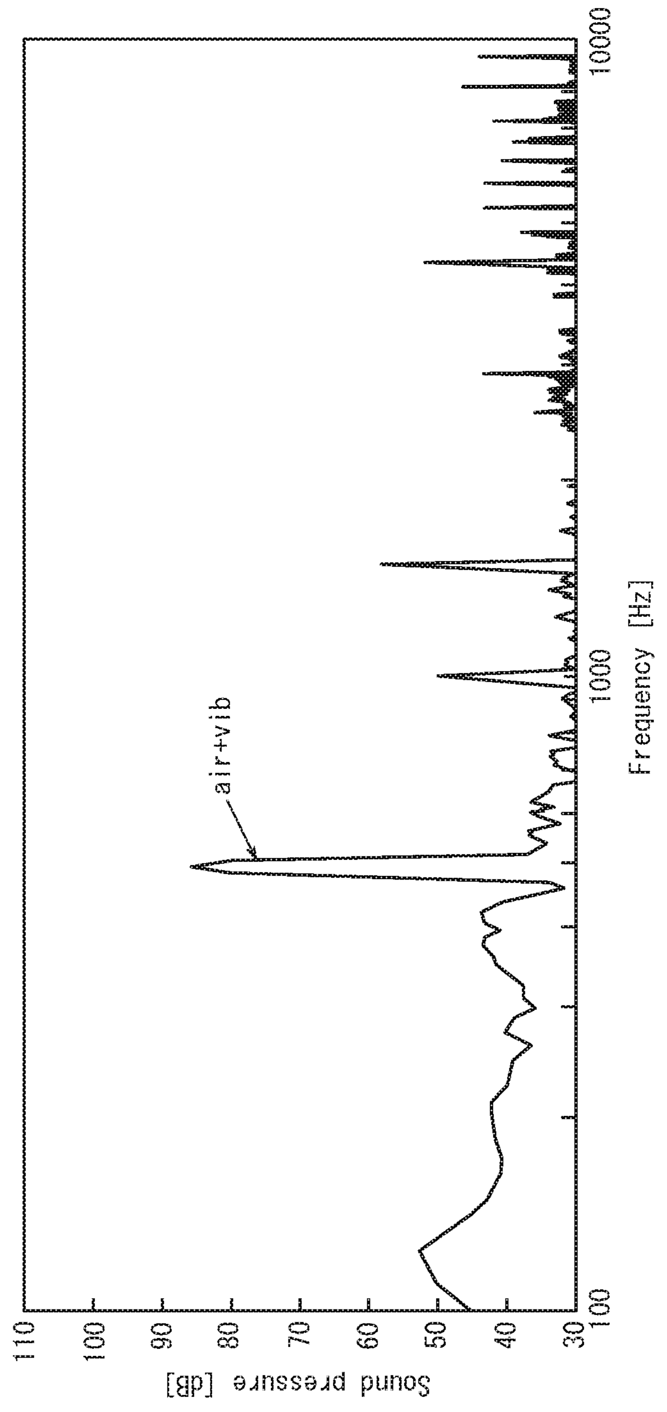
FIG. 10 illustrates the result of measuring air-conducted sound and human body vibration sound of an acoustic device with the measurement system in FIG. 1.
Figure 11:
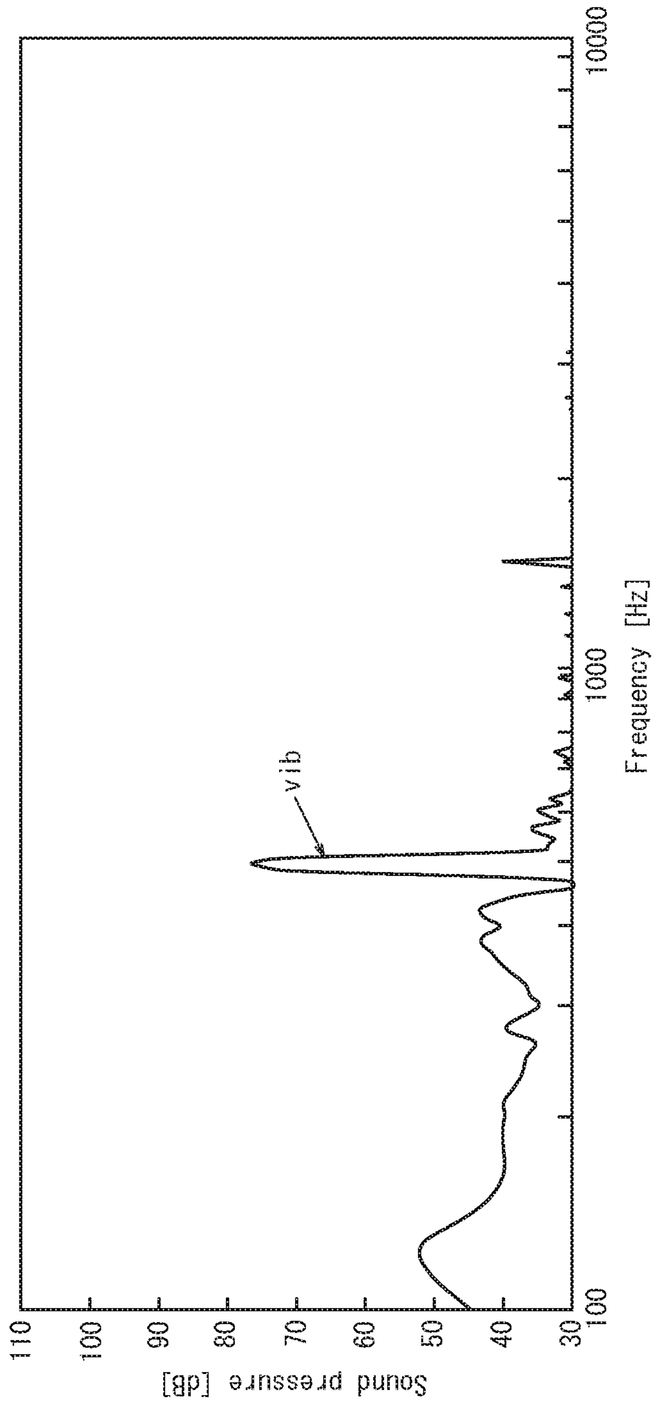
FIG. 11 illustrates the result of measuring human body vibration sound of an acoustic device with the measurement system in FIG. 1.
Figure 12:
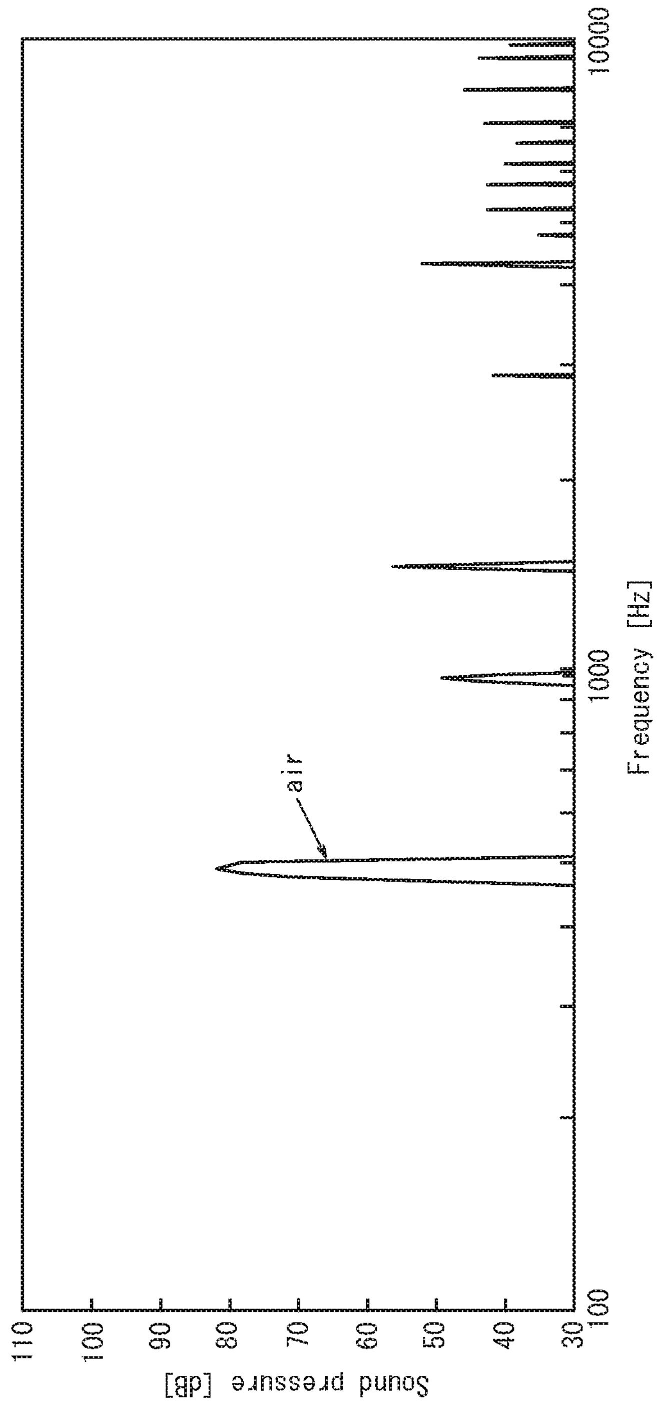
FIG. 12 illustrates the result of measuring air-conducted sound of an acoustic device with the measurement system in FIG. 1.

FIGS. 10 to 12 illustrate the power spectrum of air-conducted sound and/or human body vibration sound measured by the measurement system 10 when the vibrating body 710 of the acoustic device 1 outputs a fundamental frequency of 500 Hz while placed in contact with the tragus of the ear model 50 in the measurement system 10.

FIG. 10 illustrates the power spectrum of sound yielded by combining air-conducted sound and human body vibration sound. As illustrated in FIG. 10, a power spectrum in which a plurality of harmonics appear in addition to the fundamental frequency of 500 Hz is measured. In greater detail, the second harmonic (1000 Hz) and third harmonic (1500 Hz) appear. A plurality of harmonics at or above the sixth harmonic are also measured. The number of harmonics for which the signal-to-noise ratio (S/N) is 10 dB or more above background noise is counted. Upon counting the number of harmonics, three or more harmonics that are at or above the sixth harmonic and that have a volume exceeding a volume 45 dB below the volume of the fundamental frequency are measured. A volume exceeding a volume 45 dB below the fundamental frequency means that, for example for a fundamental frequency at 90 dB, the volume exceeds 45 dB. A harmonic for which the signal-to-noise ratio (S/N) is 10 dB or more above the background noise means that, for example for background noise of 25 dB, the volume of the harmonic is 35 dB or more. While harmonics may be defined in various ways, a definition that distinguishes from background noise is preferred. Therefore, in this context, sound that satisfies the above-mentioned conditions is referred to as a harmonic.

In FIG. 10, three or more harmonics at or above the sixth harmonic and exceeding a volume that is half of the volume of the fundamental frequency are measured. A volume that is half of the volume of the fundamental frequency means that, for example when the fundamental frequency is 90 dB, the volume is half of 90 dB, i.e. 45 dB. In this case, the harmonics that are counted in the combined sound are subjected to the condition of the sound (air+vib) that is a combination of the vibration component and the air-conducted component at the fundamental frequency being 75 dB or greater. The harmonics counted in the air-conducted sound may instead be subjected to the condition of the sound (air) of the air-conducted component at the fundamental frequency being 70 dB or greater.

Next, FIG. 11 illustrates the power spectrum of human body vibration sound. As illustrated in FIG. 11, although the fundamental frequency of 500 Hz is measured, nearly no harmonics occur. Unlike FIG. 10, in the measurement results in FIG. 11, three or more harmonics that are at or above the sixth harmonic and that have a measured value exceeding a value 50 dB below the measured value of the fundamental frequency are not measured. Three or more harmonics at or above the sixth harmonic and exceeding a value that is half of the measured value of the fundamental frequency are not measured. The human body vibration sound referred to here is not the actual vibration energy generated by the vibration member (conceptually, at least III and IV in FIG. 7C). In other words, among the vibration energy generated by the vibration member, the human body vibration sound referred to here is the component measured by the vibration detection element 56 (conceptually, IV in FIG. 7C) excluding components such as the energy converted to an air-conducted component in the artificial external ear canal 52 or the like (conceptually, III in FIG. 7C). It is thus clear that people do not hear sufficient harmonics via the vibration component.

Next, FIG. 12 illustrates the power spectrum of air-conducted sound. As illustrated in FIG. 12, a power spectrum in which a plurality of harmonics appear in addition to the fundamental frequency of 500 Hz is measured. In greater detail, the second harmonic (1000 Hz) and third harmonic (1500 Hz) appear. A plurality of harmonics are also measured at or above the sixth harmonic, and three or more harmonics that are at or above the sixth harmonic and that have a volume exceeding a volume 45 dB below the volume of the fundamental frequency are measured. In FIG. 12, three or more harmonics at or above the sixth harmonic and exceeding a volume that is half of the volume of the fundamental frequency are measured. The air-conducted sound referred to here is the air-conducted sound measured by the microphone 62 and therefore is the combined volume of the component emitted from the vibration member as air-conducted sound and the air-conducted sound component converted to air-conducted sound at the inner wall of the artificial external ear canal (II and III in FIG. 7C).

It is thus clear that harmonics in the power spectrum appear as air-conducted sound and are not produced much by the human body vibration sound itself.

While the results for removing the ear model 50 from the measurement system 10 to expose the microphone 62 and measuring only the component generated by the vibration member as air-conducted sound (conceptually, II in FIG. 7C) are not illustrated, experiments showed that in the vibration member with the above-described size, the air-conducted sound corresponding to II in FIG. 7C is sufficiently small with respect to III in FIG. 7C, and hence the effect on hearing in a human body can be ignored. The air-conducted sound (conceptually, II in FIG. 7C) being sufficiently small is not being identified as problematic; rather, the finding being reported is that this air-conducted sound is actually sufficiently small. Accordingly, it is also acceptable if the acoustic device itself can produce harmonics via air-conducted sound (II in FIG. 7C).

Therefore, from the above-described results, it is thought that in the acoustic device 1 that was targeted for measurement, at least among the vibration component generated by the vibration member, the component converted to air-conducted sound (III in FIG. 7C) fulfills a central role in generating harmonics. It is also inferred that the harmonics are largely generated at the artificial auricle 51 or the artificial external ear canal 53. Therefore, providing the artificial auricle 51 and the artificial external ear canal 53 is significant during the measurement of harmonics.

While an example in which the acoustic device is a hearing aid 1 has been described in this embodiment, this example is not limiting. For example, the acoustic device may be a headphone or earphone, in which case the microphone 720 is not provided. In this case, the acoustic device may reproduce sound based on music data stored in an internal memory of the acoustic device or sound based on music data stored on an external server or the like and transmitted over a network. The measurement system of this embodiment can also measure such acoustic devices.

In this embodiment, although measurement is made while contacting the vibrating body 710 of the acoustic device 1 to the tragus of the ear model 50 in the measurement system 10, the vibrating body 710 may be contacted to any part of the ear model 50 in the measurement system 10. For example, the vibrating body 710 may be contacted to the artificial auricle 51 of the ear model 50 in the measurement system 10.

While the fundamental frequency generated by the acoustic device 1 in this embodiment is 500 Hz, the fundamental frequency is not limited to being 500 Hz. The fundamental frequency may be a sound at any predetermined frequency within a range of 300 Hz or greater to 1000 Hz or less, such as 400 Hz, 800 Hz, or the like.

Embodiment 2

A configuration in which the harmonics measured by the measurement system 10 are displayed on a display is described as Embodiment 2. Harmonics can easily be displayed by extracting, from the measured data, sound pressure that corresponds to the $N^{th}$ frequency with respect to the fundamental frequency. For example, as illustrated in FIGS. 13A and 13B, extracting and displaying only the harmonics on the display 520 of the measurement system 20 or an externally connected display contributes to user friendliness. In the example in FIG. 13A, with respect to a fundamental frequency of 500 Hz at 90 dB, the harmonics up to 6400 Hz, i.e. the second through twelfth harmonics, are indicated as the difference with respect to the fundamental frequency.

In the example in FIG. 13B, with respect to a fundamental frequency of 500 Hz, the harmonics from the first (fundamental frequency) through the $12^{th}$ are indicated as the actual measured values.

In the example in FIG. 14A, a display target range for the above-described harmonics is stored in the measurement system 10, thereby allowing display of only the harmonics in this range. In this case, with respect to the fundamental frequency, only the numerical values of harmonics up to 6400 Hz are displayed.

As illustrated in FIG. 14B, a variety of definitions of harmonics may be stored in the measurement system 10 so as to display harmonics matching the definitions in a different display format than harmonics not matching the definitions. In this case, the display color differs between harmonics that do and do not exceed a volume 40 dB below the fundamental frequency.

Figure 15A:
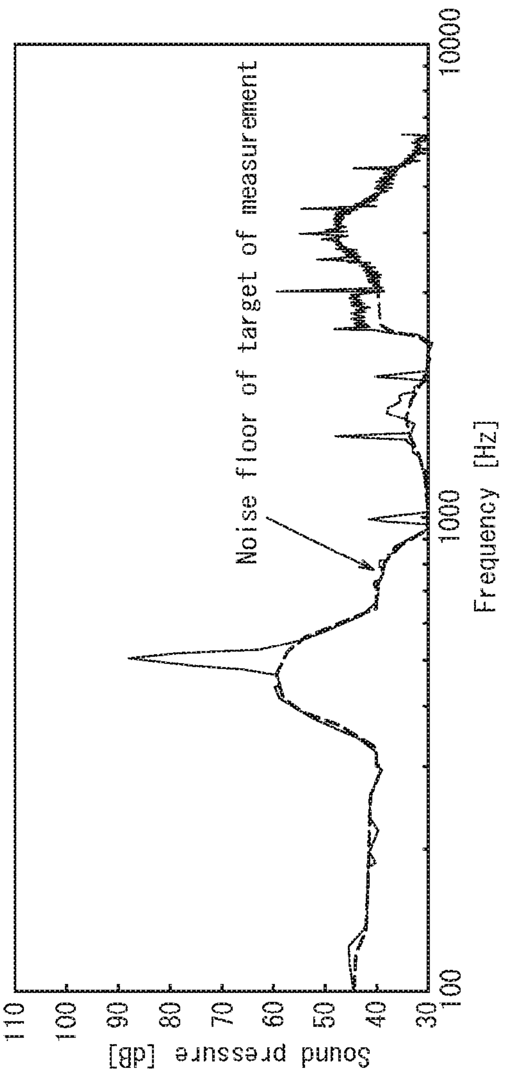
FIGS. 15A and 15B illustrate a modification to the display of measurement results in FIGS. 13A and 13B.

As illustrated in FIG. 15A, the measurement system 10 may display the background noise along with the measurement results. The measurement system 10 may establish the background noise level by a comparison with the sound pressure at frequencies measured before and after a frequency corresponding to the $N^{th}$ harmonic. For example, if the measurement pitch is 25 Hz in a frequency band that includes 3000 Hz, then the measurement system 10 differentiates between the cases of the difference (S/N) between the sound pressure at 3000 Hz, which is the sixth harmonic, and the sound pressure at each of 2975 Hz and 3025 Hz, which are measurement points before and after 3000 Hz, being 10 dB or greater and not being 10 dB or greater. The measurement system 10 establishes 2975 Hz and 3025 Hz as the background noise levels on each side and takes the average of the background noise levels on each side as the background noise level at 3000 Hz.

Figure 15B:
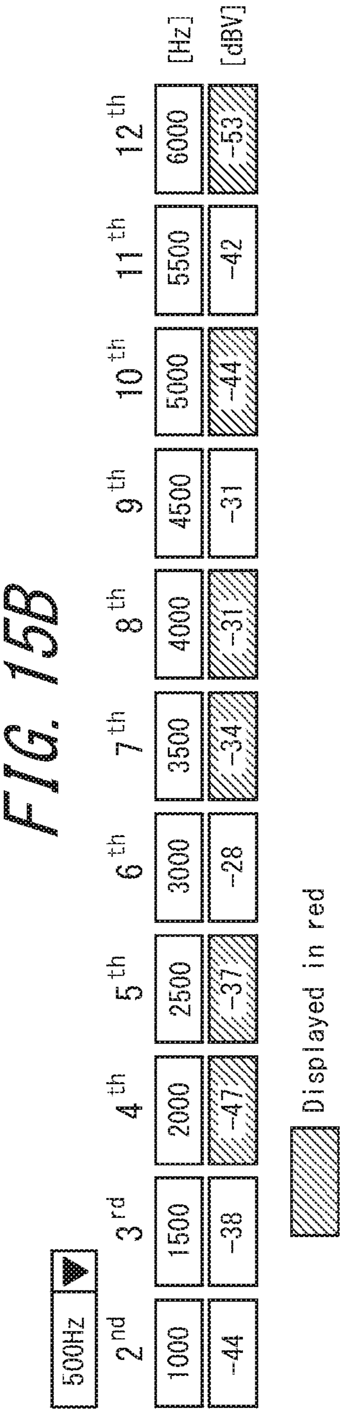

As illustrated in FIG. 15B, the measurement system 10 may also vary the display between the harmonic at 3000 Hz, for which the difference from the background noise is 10 dB or more, and the harmonic at 3500 Hz, for which the difference from the background noise is not 10 dB or more.

In this way, by dividing the harmonics into harmonics that effectively contribute in terms of auditory sensation and harmonics that are buried in background noise and contribute little in terms of auditory sensation, the capability of the vibration generating acoustic device to generate harmonics can easily be known.

An acoustic device that generates harmonics is generally considered to be an undesirable acoustic device with a great deal of high-harmonic distortion. High-degree harmonics, however, have the effect of providing sound with depth, yielding a solid, clear sound that carries well. Therefore, in an acoustic device such as a hearing aid, it is assumed that sound will be heard better by utilizing this advantage. In the measurement system of this disclosure, the characteristics of a vibration generating acoustic device with respect to harmonics can easily be known by displaying the harmonics that the acoustic device causes to be generated in the user's auricle or external ear canal.

Embodiment 3

The following describes Embodiment 3. As compared to Embodiments 1 and 2, the structure of the measurement system 10 differs in Embodiment 3. The remaining structure is the same as in Embodiment 1 or 2. Where the structure is the same as in Embodiment 1 or 2, the same reference signs are applied, and a description thereof is omitted.

Figure 16:
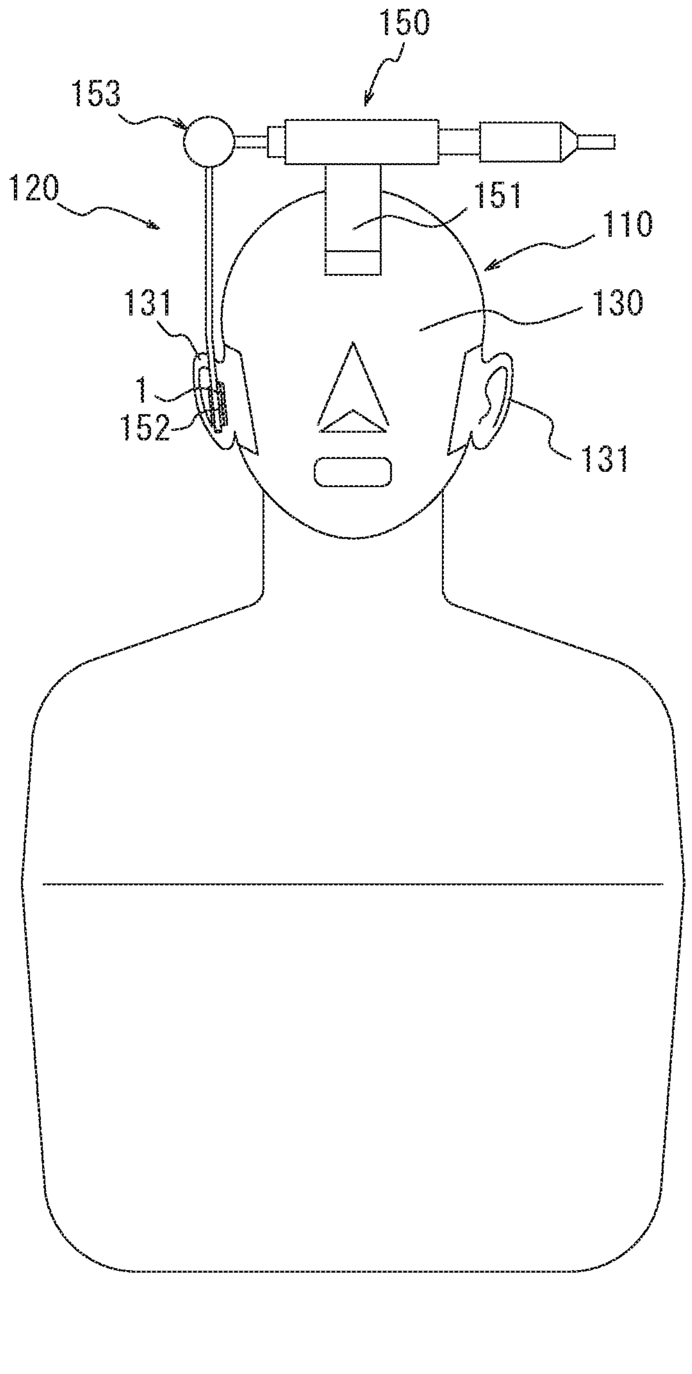
FIG. 16 schematically illustrates the structure of a section of a measurement system according to Embodiment 3.

FIG. 16 schematically illustrates the structure of a section of a measurement system according to Embodiment 3. In the measurement system 110 of this embodiment, the structure of an acoustic device mount 120 differs from that of the acoustic device mount 20 in Embodiment 1, whereas the remaining structure is similar to that of Embodiment 1. Accordingly, the measurement unit 200 in Embodiment 1 is omitted from FIG. 16. The acoustic device mount 120 is provided with a human head model 130 and a holder 150 that holds the acoustic device 1 targeted for measurement. The head model 130 is, for example, HATS, KEMAR, or the like. Artificial ears 131 of the head model 130 are detachable from the head model 130.

Figure 17A:
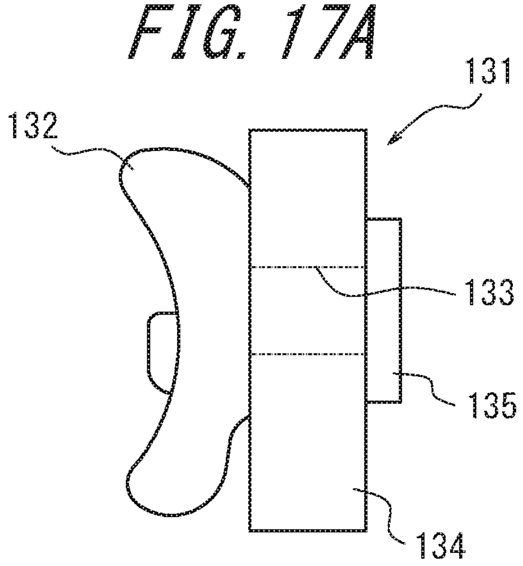
FIGS. 17A and 17B are detailed partial diagrams of the measurement system in FIG. 16.
Figure 17B:
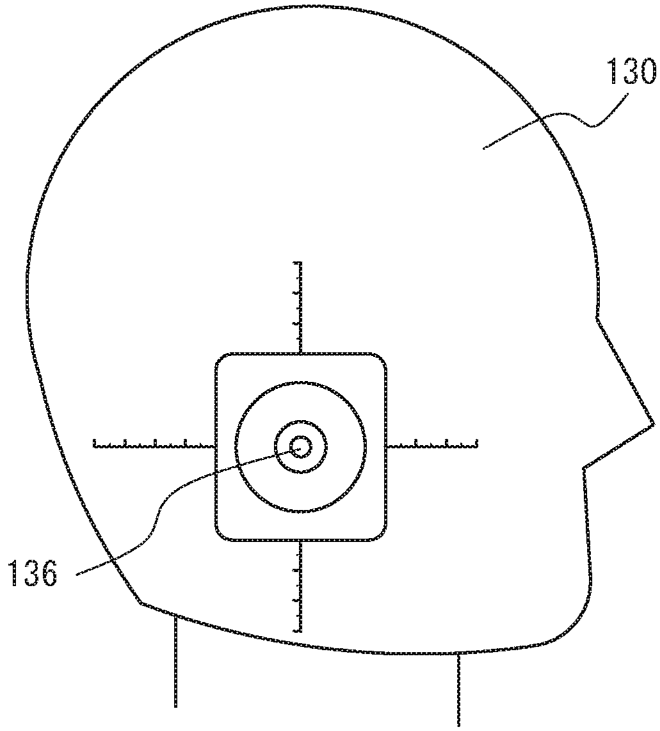

The artificial ear 131 forms an ear model and includes, like the ear model 50 in Embodiment 1, an artificial auricle 132 and an artificial external ear canal unit 134, joined to the artificial auricle 132, in which an artificial external ear canal 133 is formed, as illustrated by the side view in FIG. 17A of the artificial ear 131 removed from the head model 130. Like the ear model 50 in Embodiment 1, a vibration detector 135 provided with a vibration detection element is disposed at the periphery of the opening in the artificial external ear canal 133 in the artificial external ear canal unit 134. As illustrated by the side view in FIG. 17B with the artificial ear 131 removed, a sound pressure gauge 136 provided with a microphone is disposed in the central region on the mount for the artificial ear 131 in the head model 130. The sound pressure gauge 136 is disposed so as to measure sound pressure of sound propagating through the artificial external ear canal 133 of the artificial ear 131 once the artificial ear 131 is mounted on the head model 130. Like the ear model 50 in Embodiment 1, the sound pressure gauge 136 may be disposed on the artificial ear 131 side. The vibration detection element with which the vibration detector 135 is configured and the microphone with which the sound pressure gauge 136 is configured are connected to the measurement unit in a similar way as in Embodiment 1.

A holder 150 is attached to the head model 130 detachably and includes a head fixing portion 151 for fixing to the head model 130, a support 152 that supports the acoustic device 1 targeted for measurement, and an articulated arm 153 connecting the head fixing portion 151 and the support 152. The holder 150 is configured so that, like the holder 70 in Embodiment 1, the pressing force and contact position, on the artificial ear 131, of the acoustic device 1 supported by the support 152 can be adjusted via the articulated arm 153.

The measurement system 110 of this embodiment yields measurement results similar to those of the measurement system 10 of Embodiment 1. Among other effects, in this embodiment, the acoustic device 1 is evaluated by detachably mounting the artificial ear 131 for vibration detection on the human head model 130, thus allowing evaluation that conforms more closely to the actual form of use by taking into consideration the effect of the head. Of course, harmonics that do and do not satisfy a predetermined condition with respect to the fundamental frequency may be distinguished between and displayed, or only harmonics that satisfy a condition may be extracted and displayed.

Although this disclosure is based on embodiments and drawings, it is to be noted that various changes and modifications will be apparent to those skilled in the art based on this disclosure. Therefore, such changes and modifications are to be understood as included within the scope of this disclosure. For example, the functions and the like included in the various units and members may be reordered in any logically consistent way. Furthermore, units and members may be combined into one or divided.

In the above embodiments, the measurement unit includes various functional units that execute certain functions. These functional units have been described schematically in order to briefly illustrate the functionality thereof. It should be noted that particular hardware and/or software is not necessarily indicated. In this sense, it suffices for the functional units and other constituent elements to be hardware and software implemented so as to substantially execute the particular functions described here. The various functions of different constituent elements may be combined with or separated from hardware and software in any way, and each may be used individually or in some combination. In this way, the various subject matter disclosed herein may be embodied in a variety of forms, and all such embodiments are included in the scope of the subject matter in this disclosure.

REFERENCE SIGNS LIST

1 Acoustic device (hearing aid)
10, 110 Measurement system
20 Acoustic device mount
30 Base
31 A/D converter
32 Signal processor
33 D/A converter
34 Piezoelectric amplifier
50 Ear model
51 Artificial auricle
52 Artificial external ear canal unit
53 Artificial external ear canal
54 Support member
55 Vibration gauge
56 Vibration detection element
60 Sound pressure gauge
61 Tube member
62 Microphone
70 Holder
71 Support
72 Arm

73 Movement adjuster
10*a* Vibrating body
20*a* Microphone
120 Acoustic device mount
130 Head model
131 Artificial ear
132 Artificial auricle
132 Artificial auricle
133 Artificial external ear canal
134 Artificial external ear canal unit
135 Vibration detector
136 Sound pressure gauge
150 Holder
151 Head fixing portion
152 Support
153 Articulated arm
200 Measurement unit
300 Sensitivity adjuster
301, 302 Variable gain amplifier circuit
400 Signal processor
410 A/D converter
411, 412 A/D conversion circuit
420 Frequency characteristic adjuster
421 Equalizer
430 Phase adjuster
431 Variable delay circuit
440 Output combiner
450 Frequency analyzer
460 Memory
470 Signal processing controller
500 PC
510 Connection cable
520 Display
521 Application screen
522-524 Icon
525 Measurement result display area
526 Icon to change measurement range
527 Measurement result display selection area
528 File icon
529 Measurement type icon
530 Help icon
600 Printer

The invention claimed is:

1. A measurement system comprising:

an ear model including an artificial auricle and an artificial external ear canal; and an air-conducted sound gauge configured to measure air-conducted sound in the artificial external ear canal, wherein while an acoustic device including a vibrating body and configured to transmit sound to a user when the vibrating body is pressed against an auricle of the user is placed in contact with the ear model, the measurement system executes control for measurement, with the air-conducted sound gauge, of harmonics in an air-conducted component generated by a pure tone emitted by the acoustic device and control to display a result of the measurement on a display, wherein among the harmonics, harmonics satisfying a predetermined condition and harmonics not satisfying the predetermined condition are displayed in different display formats, and the predetermined condition is settable by a user.

2. The measurement system of claim 1, further comprising a vibration sound gauge configured to measure vibration sound in the ear model, wherein the measurement system executes control for measurement, with the air-conducted sound gauge and the vibration sound gauge, of harmonics in an air-conducted component and harmonics in a vibration component generated by a pure tone emitted by the acoustic device and control to display a combined component, yielded by combining the air-conducted sound and the vibration sound, on the display.

3. The measurement system of claim 1, wherein among the harmonics, only harmonics satisfying a predetermined condition are displayed.

4. The measurement system of claim 3, wherein the predetermined condition is settable by a user.

5. The measurement system of claim 3, wherein the predetermined condition is that a difference with respect to background noise is a predetermined value or greater.

6. The measurement system of claim 3, wherein the predetermined condition is that a difference with respect to a fundamental frequency is not a predetermined value or greater.

7. The measurement system of claim 3, wherein the predetermined condition is that of being within a predetermined frequency band.

8. The measurement system of claim 1, wherein the predetermined condition is that a difference with respect to background noise is a predetermined value or greater.

9. The measurement system of claim 1, wherein the predetermined condition is that a difference with respect to a fundamental frequency is not a predetermined value or greater.

10. The measurement system of claim 1, wherein the predetermined condition is that of being within a predetermined frequency band.

11. The measurement system of claim 1, wherein the measurement system displays a background noise level along with the harmonics that are the result of the measurement.

12. A measurement system comprising:

an ear model including an artificial auricle; and a vibration sound gauge configured to measure vibration sound in the ear model, wherein while an acoustic device including a vibrating body and configured to transmit sound to a user when the vibrating body is pressed against an auricle of the user is placed in contact with the ear model, the measurement system executes control for measurement, with the vibration sound gauge, of harmonics in a vibration component generated by a pure tone emitted by the acoustic device and control to display a result of the measurement on a display, wherein among the harmonics, harmonics satisfying a predetermined condition and harmonics not satisfying the predetermined condition are displayed in different display formats, and the predetermined condition is settable by a user.

* * * * *